United States Patent
Hunter

(10) Patent No.: US 9,613,044 B2
(45) Date of Patent: Apr. 4, 2017

(54) MAINTAINING CONCURRENCY AND CONSISTENCY OF GLOBALLY UNIQUE IDENTIFIERS

(71) Applicant: Dropbox, Inc., San Francisco, CA (US)

(72) Inventor: Rian Hunter, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/726,000

(22) Filed: May 29, 2015

(65) Prior Publication Data
US 2015/0261781 A1    Sep. 17, 2015

Related U.S. Application Data

(63) Continuation of application No. 13/797,292, filed on Mar. 12, 2013, now Pat. No. 9,071,654.

(60) Provisional application No. 61/746,427, filed on Dec. 27, 2012.

(51) Int. Cl.
  *G06F 17/30* (2006.01)
  *H04L 29/08* (2006.01)
  *H04L 29/06* (2006.01)

(52) U.S. Cl.
  CPC .. *G06F 17/30171* (2013.01); *G06F 17/30144* (2013.01); *G06F 17/30864* (2013.01); *H04L 63/0428* (2013.01); *H04L 67/32* (2013.01); *H04L 67/1097* (2013.01)

(58) Field of Classification Search
  None
  See application file for complete search history.

(56) References Cited

U.S. PATENT DOCUMENTS

| | | | | |
|---|---|---|---|---|
| 5,737,611 | A * | 4/1998 | Vicik | G06F 9/52 710/200 |
| 6,044,393 | A * | 3/2000 | Donaldson | G06F 9/45512 714/E11.188 |
| 8,752,057 | B1* | 6/2014 | Gould | G06F 9/52 718/102 |
| 2003/0041173 | A1* | 2/2003 | Hoyle | G06F 9/526 709/248 |
| 2004/0093602 | A1* | 5/2004 | Huston | G06F 9/526 718/107 |
| 2007/0209005 | A1* | 9/2007 | Shaver | G06F 17/3089 715/733 |

(Continued)

*Primary Examiner* — Peling Shaw
(74) *Attorney, Agent, or Firm* — Polsinelli PC

(57) ABSTRACT

Systems, methods, and computer-readable storage media for ensuring data consistency and concurrency for globally unique identifiers (GUIDs) and associated content items via locking. A content management system configured to practice the method can receive, from a client device, a request to perform a content item operation in a storage environment that affects a GUID. Then the content management system can acquire a first mutex for a namespace associated with the content item operation, such as an application-level lock, and acquire a second mutex for the GUID, such as a row-level lock in a database table. After acquiring the locks, the content management system can perform the content item operation according the request, and update the GUID based on the content item operation. Then the content management system can release the mutexes and provide a confirmation to the client device in response to the request.

19 Claims, 14 Drawing Sheets

(56) References Cited

U.S. PATENT DOCUMENTS

2007/0289019 A1* 12/2007 Lowrey ................ G06F 21/554
    726/24
2008/0263103 A1* 10/2008 McGregor ........ G06F 17/30029
2012/0023295 A1* 1/2012 Nemawarkar ........ H04L 47/621
    711/130

* cited by examiner

MAINTAINING CONCURRENCY AND CONSISTENCY OF GLOBALLY UNIQUE IDENTIFIERS

CROSS REFERENCE TO RELATED APPLICATIONS

This application is a continuation of U.S. patent application Ser. No. 13/797,292, filed Mar. 12, 2013, which claims the benefit of and priority to U.S. Provisional Patent Application No. 61/746,427, filed on Dec. 27, 2012, the contents of each of the above patent applications are hereby expressly incorporated by reference in their entirety for all purposes herein.

TECHNICAL FIELD

The present technology pertains to Globally Unique Identifiers (GUIDs) for content items, and more specifically pertains to GUIDs for individual content items in a multi-user network-based content management environment.

BACKGROUND

A multi-user network-based content management environment (storage environment) allows users to upload and store content items in a data storage medium associated with an account, which the users may then access from virtually any network-enabled computing device. However, as the number of users and content items increases in such a storage environment, the complexity and quantity of data quickly scale and become difficult to manage. One way to manage these content items is by storing them in a particular directory structure that reflects content item relationships and access permissions. However, this approach can introduce problems or limitations when implementing sharing between user accounts or when attempting to increase storage efficiency.

SUMMARY

Particular features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

The approaches set forth herein can be used to assign every content item in a multi-user network-based content management environment (storage environment) a Globally Unique Identifier (GUID), instead of relying solely on content item paths and/or content item names in a hierarchical directory structure. The storage environment can include one or more storage devices, one or more servers, network infrastructure, other computing devices, databases, and so forth. FIG. 9, discussed below, provides a more detailed view of an example storage environment. For example, the content management environment can store content items in virtually any data storage location or locations, and can maintain a GUID for each content item to uniquely identify that content item regardless of where it is stored. Typically the storage environment assigns a GUID to a content item at a content item creation event, and the storage environment maintains that GUID association with the content item across user-level edit operations and user-level move operations. However the server can assign a new GUID for a user-level content item copy operation or for other operations that result in a new content item. When each content item in the space is assigned a GUID, the storage environment as well as third-party developers can easily refer to a specific content item and all of its revisions without requiring knowledge of or dependency on the location of the content item in the content item system. With GUIDs, a collection of content items in a user account at the storage environment can be represented as a plain set of content item objects, regardless of their actual location. Content item paths, as represented within the user account, are represented or stored as just another attribute of a content item object, along with other attributes such as time of creation, time of last modification, author or owner, or content item size. Thus, GUIDs allow for building new organizational structures outside of the content item system. For example, GUIDs can be used to provide a way for users to participate in comment streams for a content item, photo albums, playlists, and content items or folders that are shared, such as via a public or private URL, that aren't sensitive to or dependent on a particular content item system location. Further, GUIDs allow for a richer set of functionality for document editing and sharing. With GUIDs, the storage environment can also implement aliases, symbolic links, or shortcuts.

Systems, methods, and computer-readable storage media for ensuring data consistency and concurrency for globally unique identifiers (GUIDs) and associated content items via locking. A content management system configured to practice the method can receive, from a client device, a request to perform a content item operation in a storage environment that affects a GUID. Then the content management system can acquire a first mutex for a namespace associated with the content item operation, such as an application-level lock, and acquire a second mutex for the GUID, such as a row-level lock in a database table. After acquiring the locks, the content management system can perform the content item operation according the request, and update the GUID based on the content item operation. Then the content management system can release the mutexes and provide a confirmation to the client device in response to the request.

BRIEF DESCRIPTION OF THE DRAWINGS

The principles of the present disclosure will become more explicitly understood from the particular description of the principles disclosed with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure provides additional flexibility and functionality for multi-user network-based content management environments by the use of GUIDs. A GUID is a globally unique identifier for a content item within a particular storage space, storage domain, content item object space, or other space for storing content items. The storage space can include the entire available storage in a storage environment or a portion thereof. The storage environment can provide accounts for users which can store and access their own content items in the storage environment. For example, a user can upload content items to the storage environment via a web interface or a native storage environment client application on a computer or other computing device. After the content items are uploaded to the account, the user can access those content items via their account from virtually any other network-enabled computing device. The user can also share content items or folders in their account with other users. Thus, the storage environment can maintain different user accounts for different users, each of which can contain numerous content items, folders, and metadata. Each item in the storage environment can be associated with a GUID.

Figure 1:
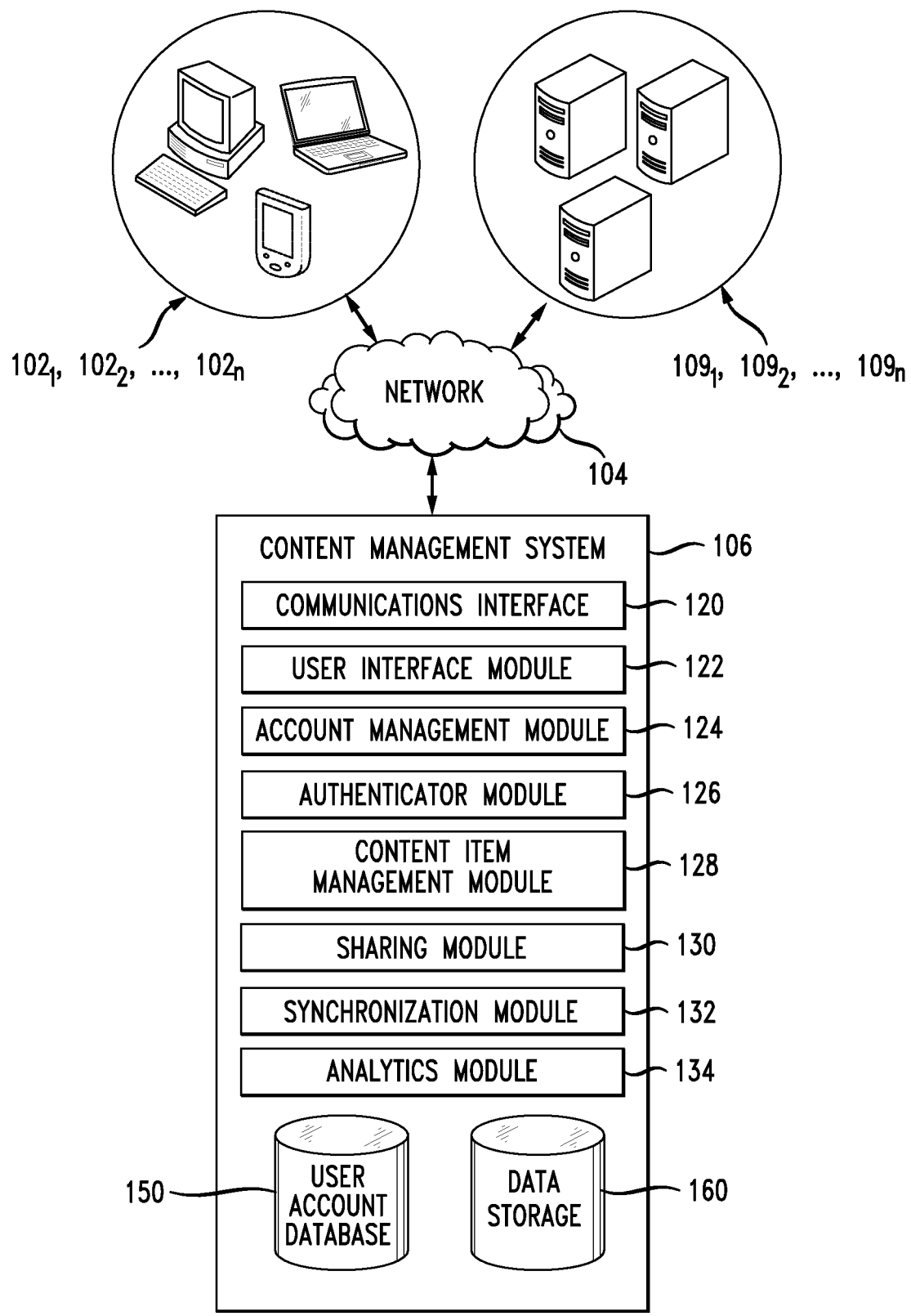
FIG. 1 shows an exemplary configuration of devices and a network.

Exemplary system configuration 100 is shown in FIG. 1, wherein electronic devices communicate via a network for purposes of exchanging content and other data. The network can be configured in a wide variety of configurations that facilitate the intercommunication of electronic devices, such as a wide area network, local area network, wireless network, etc. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the content item system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server administered by content storage 160. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of independent disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s content item system with the content in an associated user account. In some cases, the client software can synchronize any changes to content in a designated folder and its sub-folders, such as new, deleted, modified, copied, or moved content items or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection. In this scenario, the client software can monitor the linked folder for content item changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 that can track and report on aggregate content item operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content item management module 128 for maintaining a content directory identifying the location of each content item in content storage 106. The content directory can include a unique content entry for each content item stored in the content storage.

A content entry can include a content path that can be used to identify the content item. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, content management system 106 can implement GUIDs for stored content items, such as files. Client devices 102 can include a client application that communicates, via network 104, with content management system 106 to synchronize content items stored in data storage 160 and GUIDs associated with the content items. Client device 102 can include an operating system that maintains unique identifiers for the content items according to an operating system schema that may be different from the GUIDs maintained for use with content management system 106.

Content management system 106 can include, such as part of communications interface 120 and/or content item management module 128, a synchronous client interface and an asynchronous client interface for client devices 102 to access content items through content management system 106. Content management system 106 can also include a GUID generator, and a GUID processor for resolving GUID conflicts for GUIDs generated by the various client devices 102 in an asynchronous access model. Further, content management system 106 can include an encryption module that assists in securing GUID transmissions at communication boundaries.

Figure 2:
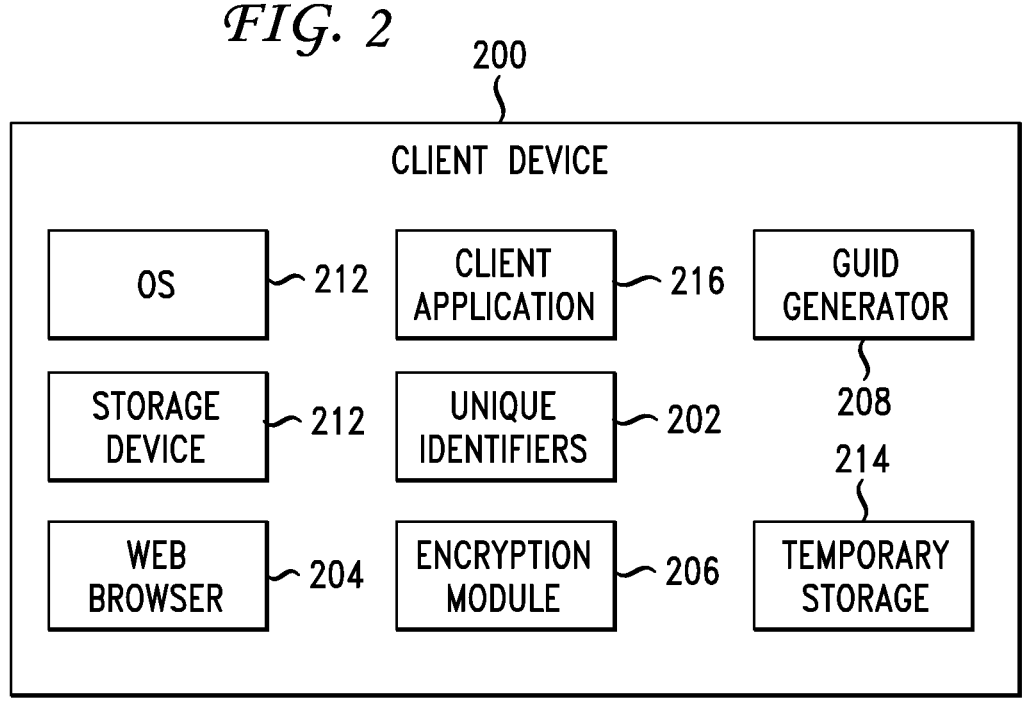
FIG. 2 shows an example client device and client application.

FIG. 2 shows an example client device 200 and client application 216 installed or running on client device 200. Client device 200 can include GUID generator 208. GUID generator 208 can generate proposed GUIDs for local content item operations that require a new GUID. However, content management system 106 can maintain the canonical GUID records. Therefore, any GUIDs proposed by GUID generator 208 may be accepted or replaced by content management system 106. The client device can include operating system specific unique identifiers for content items stored in data storage 160. Client device 200 can include encryption module 206 for communicating with content management system 106, either by decrypting encrypted GUID transmissions from content management system 106 or by encrypting GUID transmissions to content management system 106. Client device 200 can include temporary storage area 210 for use in performing certain content item operations, such as an edit operation or a copy operation. Client device 200 can include web browser 204 for accessing content management system 106 without using client application 216.

In one example, content management system 106 can represent GUIDs as 128-bit integers, each of which identifies a specific content item object in content management system 106, but GUIDs can be represented as shorter or longer integers or as other representations that are not strictly numeric, such as an alphanumeric string. Some example randomly generated 128-bit GUIDs are provided below, in hexadecimal form:

a717d6c3-9797-40d5-8300-55e894e5bd59
0aa3ed5f-e0bc-4069-aa72-9856407850f8
02126692-1a75-459e-908e-bbf0421ca045
9b195a00-30e7-49db-8a95-bc50027192a5
292370cf-ea26-4202-86f5-047f93e9ca51

GUIDs allow content management system 106 to model each namespace as a set of content item objects with unique identifiers instead of as a directory-based hierarchy of content items. GUIDs can include one of three potential relationships. The first relationship is one GUID to many content item revisions, modeled as (rev_id, ns_id, sj_id). Content management system 106 can track mappings of a GUID to a current path of the content item in content management system 106, modeled as (ns_id, path). This mapping may not exist or may be null if the content item object is not currently located anywhere in content management system 106, such as a GUID for a content item that previously existed but has since been deleted. The first relationship maps a GUID to a sequence of content item revisions for a content item object designated by that GUID. Revisions and content item objects can span multiple storage namespaces. In one embodiment, rev_id is a monotonically increasing integer that indicates the order of the revisions for that GUID.

The second relationship is one GUID to one or zero content item paths, and the third relationship is one GUID to one or zero branch points, which are similar. These relationships can be modeled as (guid, rev_id). The second and third relationships can map a GUID to another GUID at the point that the corresponding content item object was copied. This original GUID can be called a "parent GUID." GUIDs that lack a parent GUID can represent content item objects that were not derived from other content items. Content management system 106 can store these GUID relationships in one or more GUID databases, or can store these GUID relationships as metadata associated with the GUIDs or with the content item objects.

Content management system 106 may adjust or modify GUID assignments when performing logical operations on content items in the file system structure. Several examples are provided below in terms of a generic application programming interface (API) for accessing data stored in content management system 106. These example content item operations are described in terms of user-level file system operations. In this context, user-level means a high-level operation indicated by the user. Applications that access data via such an API may need to translate user-level operations into the operations described below to interact correctly with a GUID-enabled content management system 106. Each of the example operations described below can operate on an account with content management system 106 in the initial state shown below. Note that the rev parameter in the API can correspond to a server journal identifier (SJID) on a backend of content management system 106.

```
Format: <ns_id>:<rel_path> -> {<metadata_key>: <metadata_value>}
0:/foo.txt -> {guid: 0, sj_id: 0, rev: "A", is_dir: false, deleted: false}
0:/baz.txt -> {guid: 2, sj_id: 3, is_dir: false, deleted: true}
0:/qux.txt -> {guid: 2, sj_id: 5, is_dir: false, deleted: true}
0:/folder -> {is_dir: true, sj_id: 1, deleted: true}
0:/folder/bar.txt -> {guid: 1, sj_id: 2, rev: "B", is_dir: false, deleted: false}
Format: GUID:<GUID> -> [(<rev_id>, <ns_id>, <sj_id>)]
GUID:0 -> [(0, 0, 0)]
GUID:1 -> [(0, 0, 2)]
GUID:2 -> [(1, 0, 5)]
```

Content management system 106 can accomplish a simple add operation according to an API call with the following input parameters:

```
root: "account-root"
path: "/folder/baz.txt"
```

Based on these input parameters, content management system 106 can create a new content item located at "/folder/baz.txt". Content management system 106 can give this content item a new GUID and that GUID will not have any parent GUID association.

Content management system 106 can accomplish a simple edit operation according to an API call with the following input parameters:

```
root: "account-root"
path: "/foo.txt"
parent_rev: "A" (same as current rev)
```

Content management system 106 can retain the same GUID for the content item at /foo.txt, and add a new revision as indicated by the input parameters. Content management system 106 can perform some consistency checking to ensure that the revision indicated in the input parameters is valid, such as checking if a parent revision exists before linking a current revision to the parent revision.

Content management system 106 can accomplish a conflicted edit operation according to an API call with the following input parameters:

```
root: "account-root"
path: "/foo.txt"
parent_rev: "C" (different from current rev)
```

Because the parent_rev parameter does not match the current parent_rev of "foo.txt", content management system 106 can create a new content item, such as "foo (conflicted copy).txt". This new content item can have a new GUID pointing to the parent GUID 0, at rev_id 0.

Content management system 106 can accomplish a simple copy operation according to an API call with the following input parameters:

```
root: "account-root"
from_path: "/foo.txt"
to_path: "/folder/baz.txt"
```

Content management system 106 can create a new content item at "/folder/baz.txt" and assign the new content item a new GUID. The GUID of the new content item will have a parent GUID 0, at rev_id 0.

Content management system 106 can accomplish a simple move operation according to an API call that provides the following input parameters:

```
root: "account-root"
from_path: "/foo.txt"
to_path: "/folder/baz.txt"
```

Content management system 106 can move the content item "/foo.txt" to "/folder/baz.txt". The content item at "/folder/baz.txt" can keep the GUID 0 that was previously pointing to "/foo.txt". The GUID 0 also now has another revision, (1, 0, 6), and the SJID becomes 6 because it is the next consecutive SJID for the namespace 0.

Content management system 106 can accomplish a simple restore operation according to an API call with the following input parameters:

```
root: "account-root"
path: "/qux.txt" (same as latest path for this GUID)
```

Content management system 106 can restore the deleted content item "/qux.txt", and can maintain the GUID 2 that the deleted content item originally had. Further, content management system 106 can associate GUID 2 with an additional revision (2, 0, 6).

Content management system 106 can accomplish a conflicted restore operation according to an API call with the following input parameters:

```
root: "account-root"
path: "/baz.txt" (different from latest path for this GUID)
```

Content management system 106 can restore the content item "/baz.txt", but the GUID 2 that the content item "/baz.txt" originally had was last seen at a different path ("/qux.txt"). Content management system 106 can assign the content item "/baz.txt" a new GUID that points to the parent GUID 2 at the last rev_id for GUID 2 that was at "/baz.txt", which in this case is rev_id 0.

Having discussed some specific examples of content item operations, API calls, and corresponding actions performed by content management system 106, the disclosure turns to several example scenarios illustrating platform-specific details for implementing GUIDs in content management system 106. Given the preceding description of how GUID assignments change as the file system is modified, content management system 106 could propagate GUIDs correctly if the content items stored in content management system 106 were only accessible via a single, synchronous interface. However, content management system 106 can also provide an asynchronous interface that allows users to make asynchronous changes to content items without mediation. The asynchronous approach can make content item manipulation very responsive, but it can also make GUID propagation difficult.

In one example implementation of the asynchronous approach, a user can make changes to a content item stored at a local storage location, and a client application can synchronize those changes to a copy of the content item that is stored at content management system 106. However, changes to the local file system can occur by third-party applications or by the operating system itself without the client application acting as a mediator. Thus, the client application may not have a definitive way of knowing which content items are copies of other content items and which content items exist at specific locations because they were moved from other locations. The only information available to the client application may be the presence and absence of content items at specific path. The client application may not have move information. To propagate GUIDs properly in this environment, the content management system and the client application may need some way to obtain or derive move information between content items.

Due to the lack of move information, both the client application and content management system 106 synchronization logic has typically been based solely on presence and absence information, leading to an "eventually consistent system" that does not guarantee consistency at every point in time between the local storage and content management system 106. Instead the client application and content management system 106 guarantee that at some point in the future, after all activity has quiesced, the local storage will be consistent with what is stored in content management system 106.

The client application and content management system 106 can infer move and copy relationships between content items without directly mediating all move and copy operations if a unique identifier can be derived for each content item on the local file system. The semantics of such an ideal unique identifier could be the same as GUIDs at content management system 106 for at least some of the content item operations set forth above. The ideal unique identifier in the local file system could follow user-level moves and edits of a content item, but copies would generate new unique identifiers, for example. Then as the client application synchronizes changes with content management system 106, the client application can map the local file system identifier back to the last known GUID with which it was associated.

Microsoft® Windows® provides an Object ID that can serve as such an idealized unique identifier. Object IDs are preserved across edits as long as applications implement their edit behavior using ReplaceFile( ). Mac® OS X® provides a similar concept called ATTR_CMN_OBJPERMANENTID that relies on applications using exchange data( ) to implement editing. Unfortunately, such an ideal unique identifier is not universally available, such as in Linux™-based operating systems and rare file systems on Mac® OS X® that don't support exchangedata( ). When no such equivalent for the idealized unique identifier exists, the client application or content management system 106 can approximate these special identifiers using a set of heuristics and a combination of index node (inode) numbers and extended file attributes (xattrs). However, inodes may or may not follow user-level edits, and xattrs, which are a modern file system interface that support application-defined file metadata that generally follow edits, moves, and copies, may be prone to error.

Both the client application and content management system 106 can transmit and assign GUIDs to one another, and these GUIDS are synchronized between the client application and content management system 106. An example implementation of a GUID-based architecture can be built on existing, non-GUID-based content item synchronization infrastructure. In this implementation, content management system 106 can hold the canonical state of each account. Client application(s) can attempt to modify the content management system state in response to local changes and what the client application considers to be the current state of content management system 106. With respect to GUIDs, content management system 106 and the client application can be responsible for different functionality. Content management system 106 can be responsible for deciding the canonical GUID assignments and the client application can be responsible for tracking the location of a previously assigned GUID and updating content management system 106 with the new location when content items are moved or edited. Content management system 106 can treat the GUID information received from the client application as a strong hint. However, as the central coordinator for making canonical GUID assignments, content management system 106 can still be free to give any GUID to any content item. Client devices that access content items stored in the account at content management system 106 via an API or via a web interface may not play a part in the GUID assigning system outside of transparently propagating GUIDs across moves and edits using the higher-level APIs described above because they are synchronous access schemes and not asynchronous.

When migrating from an existing synchronization infrastructure that was built around path-based lookup, content management system 106 can associate GUIDs with paths as extra metadata or extended attributes. Extended attributes can associate arbitrary key-value pairs, called xattrs, with content items. Content management system 106 and the client application can transmit GUIDs between each other as xattrs. Transmitting GUIDs in this way can allow for transparent support of non-GUID-aware clients, such as clients on older systems or clients who have not yet upgraded to a GUID-aware version of the client application. The form and semantics of extended attributes for GUID tracking on older clients may depend heavily on the specific combination of application version, file system type, and operating system version being used at the clients. In most cases, xattrs are carried across all edits, moves, and copies. Content management system 106 can implement logic to handle multiple copies with the same GUID by assigning each of the multiple copies a new GUID.

On GUID-aware clients, extended attributes can associate a GUID with a content item in the internal sync logic and can guide transmission of GUIDs between content management system 106 and the client application. When syncing changes to the local file system, in addition to persisting the GUID with the content item using the native xattr system, the client application can further associate the local file system unique identifier with content management system GUID in a separate local database. When syncing local changes back up to content management system 106, the client application can read in the local identifier and lookup content management system GUID in the local database.

Two example approaches for synchronizing content items and GUIDs between content management system 106 and the client application can be commit_batch( ) and list( ). commit_batch( ) can be the ultimate endpoint for mutating content items in an account. list( ) can be used to retrieve all changes to an account that have happened after some point. All GUID bookkeeping and assignment can occur in the commit_batch( ), and the client application can retrieve canonical GUID assignments from content management system 106 via list( ). For the purposes of describing the implementation of GUIDs, an explanation of the interfaces and the extensions made to commit_batch( ) and list( ) in order to support GUIDs is provided below.

The interface to commit_batch( ) can be simple, even though commit_batch( ) internally can be very complex. Commit_batch( ) can accept a list of dictionaries of content item metadata to be added to the account, keyed by namespace ID and path. Commit_batch( ) can perform best when called to modify only a single namespace because namespaces are partitioned across many databases. Modifying a single namespace can limit the amount of databases the server has to interact with. An example usage of commit_batch( ) in Python is provided below:

```
content item_metadata = [{'ns_id' : 0,
    'path' : "/foo.txt",
```

-continued

```
    # 'blocklist' defined somewhere else
    'blocklist' : blocklist,
    'size' : 4 * 1024 * 1024,
    'mtime' : 1340067856,
    'is_dir' : False,
    # 'guid_xattr' defined somewhere else
    'attrs' : {'account-root' :
        {'guid' :
            {'data' : guid_xattr}}},
    'target_ns' : None,
    # when "parent" attributes don't match the
    # current latest version for the path then the
    # server returns 'conflict', (None means this
    # change derives from no earlier server version)
    'parent attrs' : None,
    'parent_blocklist' : None}]
ret = commit_batch(content item_metadata)
commit_result = ret['results'][0]
if isinstance(commit_ result, (int, long)):
    print "Commit was successful! sjid: %r" % (commit_result,)
else:
    print "Commit was not successful! error: %r" % (commit_result,)
```

This example demonstrates that the GUID xattr for the content item can be stored in the guid_xattr variable and sent up in the attrs key of the metadata dictionary used as input to commit_batch( ). The GUID sent up here only serves as a hint, as set forth above. If it conflicts with another GUID already assigned by content management system 106, this content item might be assigned a new GUID.

In addition to the path to GUID mappings provided by the extended attributes system, content management system 106 can track several related mappings, such as the one GUID to many revisions and one GUID to one branch point mapping discussed above. Modifications to commit_batch( ) can accommodate updating these mappings when changes to a content items in an account occur. Performing the GUID bookkeeping synchronously with commit_batch( ) can ensure that at every point in time the GUID state is always consistent with the state of every account.

In one example, the modified assignment logic can filter all of the new rows to the server_file_journal (SFJ) table generated by commit_batch( ) through another layer of logic that can responsible for updating the relevant tables that store the GUID mappings. However, the modified assignment logic can alternatively modify other tables or can be incorporated as part of an existing table. If content management system 106 could trust the path/GUID associations sent by the client application, content management system 106 could update the GUID mappings relatively easily just from the new "inserts" to SFJ generated by commit_ batch( ). Unfortunately, some client applications may not have strong GUID tracking mechanisms, such as the older client application versions or Linux™ clients discussed above. Content management system 106 can verify that the content items are not being committed with conflicting GUIDs. Further, commit_batch( ) can include or invoke some additional heuristics to decide what GUID to give a content item. This may be especially important when a client tries to commit a GUID that conflicts with another content item in order to correct the conflict and assign proper GUIDs for one or both of the conflicting content items. Table 1 below shows some example heuristics, a short description of the situation in which the example heuristics may apply, and a corresponding result of applying the heuristic to a GUID conflict.

TABLE 1

| Heuristic Name | Description | Result |
| --- | --- | --- |
| simple-retain | The path is being committed with a GUID that is already assigned to it. | Insert path gets attempted GUID |
| simple-carry | Only two inserts are in this insert batch: the path that had the GUID is being deleted and another path is being committed with that GUID. | Insert path gets attempted GUID |
| simple-carry-with-adds | A modification of simple-carry, except there are only many other unrelated adds being inserted. | Insert path gets attempted GUID |
| simple-carry-with-deletes | Similar to simple-carry, except there are only many unrelated deletes being inserted. | Insert path gets attempted GUID |
| simple-carry-with-many | Similar to simple-carry, except there are many other unrelated changes. | Insert path gets attempted GUID |
| directory-carry | Similar to simple-carry except that instead of the previous path with the GUID being deleted, it is instead being committed as a directory. | Insert path gets attempted GUID |
| lost-carry | Similar to simple-carry except that instead of the previous path with the GUID being deleted, it is instead being committed without any GUID. | Insert path gets attempted GUID |
| simple-unmapped | The GUID being attempted for this content item isn't currently assigned to any other path and this is the only path attempting to get this GUID. | Insert path gets attempted GUID |
| simple-preexisting | Only a single content item in this insert batch is being committed with this GUID but this GUID is already assigned to another content item | Insert path gets new GUID |
| complex-retain | Many content items in the insert batch are attempting to obtain this GUID but this content item has the same path as the current content item with this GUID. | Insert path gets attempted GUID |
| complex-preexisting | Many content items in the insert batch are attempting to obtain this GUID. | Insert path gets new GUID |
| complex-preexisting-with-real | Similar to complex-preexisting except that the actual holder of this GUID is included in the insert batch. | Insert path gets new GUID |
| simple-restore | File is being restored and attempts a GUID that was last seen at the same path. | Insert path gets attempted GUID |
| restore-preexisting | File is being restored and attempts a GUID that was last seen at a different path. | Insert path gets new GUID |

An additional modification to commit_batch( ) can change the return value to return the final GUID assignment for each content item in its result dictionary. This modification can be similar to how commit_batch( ) returns the list of assigned SJIDs in the order that content items were submitted in the input list. But instead, the modified commit_batch( ) can return a list of assigned GUIDs in the same order. This modification can allow the client application to eagerly associate local content item IDs, such as the native GUID or inode, with the canonical GUID maintained by content management system 106.

The interface to list( ) can be modified to accommodate GUIDs as well. Unlike commit_batch( ), list( ) can be simple in both implementation and interface. The interface for list( ) can accept a dictionary that represents a mapping from namespace ID to SJID and returns all latest content item metadata. For example, the content item metadata can be stored in a format similar to the input to commit_batch( ). The dictionary can include mappings for each path for each namespace that has an SJID larger than the input SJID for the corresponding namespace, for example. Essentially list( ) can perform a query similar to the example database query provided below:

```
SELECT * FROM server_file_journal WHERE ns_id = %(ns_id)s AND
latest =
1 AND id > %(l3sjid);
```

The interface to list( ) can be modified to communicate GUIDs back to the client device in the space where xattrs are sent down. Further, list( ) can transform GUIDs from their native form before being sent down to the client.

Either content management system 106 or the client application can generate new GUIDs. GUIDs can be generated according to some algorithm or for a particular range. For example, content management system 106 can assign a client application a specific range within which to generate new GUIDs either serially, randomly, or according to some algorithm. In one embodiment, either content management system 106 or the client application can generate new GUIDs randomly according to the UUID4 algorithm in Python in order to avoid GUID collisions.

After a GUID is generated, content management system 106 can serialize and transmit the GUID to the client application, or vice versa. When serialized into an xattr for the storage backend, content management system 106 can store the UUID.bytes attribute of the GUID. To make targeted GUID spoofing more difficult content management system 106 can also encrypt each GUID at the communication boundary with each external client, such as client applications and clients that access content management system 106 via API calls or a web interface. The encryption key can be derived from the concatenation of a client-specific key and a secret version-specific encryption key, for example. For client applications or a web interface, the client-specific key can be the user ID of the client accessing the data. For API applications, the client-specific key can be a combination of the application ID and the user ID of the user on whose behalf the API application is acting. Content management system 106 can implement AES encryption, for example, to encrypt the GUID with a key derived using bcrypt on the relevant encryption key. Content management system 106 can sign this encrypted key by appending an HMAC using a bcrypt derived key from the concatenation of a secret version-specific "sign key" and the client-specific key. Pseudo code for this process is provided below:

```
def encrypt_guid(guid):
    encrypt_key = ENCRYPT_KEYS[VERSION]
    sign_key = SIGN_KEYS[VERSION]
    client_key = hex(user_id) + (hex(app_id) if IS_API_APP( ) else '')
    d_encrypt_key = bcrypt(client_key, salt=encrypt key)
    encrypted_guid = aes(str(guid), d_encrypt_key)
    to_sign = encrypted_guid + ord(VERSION)
    d_sign_key = bcrypt(client_key, salt=sign_key)
    signature = hmac_sha256(to_sign, d_sign_key)
    # length should be 16 + 1 + 15 == 32
    return to_sign + signature[:15]
```

This encryption process can provide for each user, and applications acting on behalf of users, a distinct view of the GUID space. This prevents application developers from sharing GUIDs across applications and users. This process also prevents GUIDs from syncing across user installations of the client application.

Turning now to the storage backend, or where content management system 106 actually stores the content items, GUIDs, and other metadata, the GUID backend can use three major mappings: one GUID to many revisions, one GUID to one or zero content item paths, and one GUID to one or zero branch points. In one implementation, the storage backend maintains these mappings in three database tables: guid_revision, guid_path, and guid_parent. If no row exists in the guid_path table for a specific GUID or the associated columns are 0 (" " for the filename column), the storage backend can assume that no path is currently associated with that GUID. These tables may be sharded across multiple physical computing devices using a prefix of the GUID as a key into a global table that maps from this prefix to the corresponding computing device containing the shard. The length of the prefix used for the shard key depends on the number of shards available. The prefix of newly generated GUIDs can be uniformly distributed so that GUID storage is evenly spread out across the shards.

Content management system 106 can get the latest revision row for a GUID, by executing a query such as the following:

SELECT*FROM guid_latest WHERE guid=% (guid)s;

Content management system 106 can carry out this query, as well as maintain the guid_latest table, instead of performing a "group by" query on the maximum rev_id in the guid_revision table, to limit the amount of disk pages kept in a page cache of a database server. Even though the "group by" query would be efficient from the perspective of purely doing disk IO, because of the layout of the indexes on disk, the amount of latest rows per page in cache is likely to be much lower compared to the amount of latest rows per page from the guid_latest table. A row in the guid_latest table where the parent_hash and the filename columns are NULL indicates that the GUID is not currently mapped to any location in content management system 106 file system. It is an error for the parent_hash column to be NULL and filename column to not be NULL or vice-versa.

When restoring a content item, content management system 106 can determine the latest rev_id at which the GUID was seen at that path. Content management system 106 can perform a "group by" query on the maximum rev_id for that GUID at that path in the guid_revision table. An example query is provided below:

```
SELECT guid, max(rev_id) FROM guid_revision WHERE guid = %(guid)
AND
parent_hash = %(parent_hash) AND filename = %(filename) GROUP BY guid;
```

Content management system 106 can further ensure concurrency, consistency, and locking of the GUIDs while performing GUID operations. To ensure consistency between the GUID tables, content management system 106 can permit only a single writer to modify the state of any single GUID at any given point in time. Content management system 106 can impose a strong consistency requirement for GUIDs with the state of the server_file_journal table. A GUID cannot be removed from or added to a namespace without ensuring that the consistent operation happens atomically with server_file_journal and vice-versa. To ensure this consistency, content management system 106 can require that all modifications to the state of any GUID occur within a doubly-nested critical region where a mutex is first acquired for the namespace to be modified and then another mutex is acquired for the GUID to be modified.

As part of the current scheme for ensuring consistency within a specific namespace, commit_batch( ) can acquire a mutex for each namespace that it modifies. To further ensure consistency for GUIDs, commit_batch( ) can acquire a mutex for every GUID that will be modified during the request. Content management system 106 can implement application-level locks for GUIDs, but because application-level locks are limited to a single application-level lock on a connection at a time, content management system 106 can optionally use row-level locks to implement the GUID mutex. For example, content management system 106 can obtain a row-level lock on each row of the guid_path table, and before obtaining the lock content management system 106 can ensure the row exists in the table, as shown below:

```
INSERT IGNORE INTO guid_path (guid) VALUES (%(guid)s);
SELECT 1 FROM guid_path WHERE guid = %(guid)s FOR UPDATE;
```

For a commit_batch( ) content management system 106 can acquire a GUID lock for every GUID that the client application is attempting to assign, as well as a lock for every GUID that is becoming abandoned as a result of paths being deleted or converted into directories or otherwise being given a new GUID. The set of GUIDs that content management system 106 is trying to assign to is easily derivable from the input to commit_batch( ). The set of GUIDs that are being abandoned can be derived from the previous latest SFJ entry for each of the paths. Since content management system 106 acquires the namespace locks first, this information is queryable before acquiring the GUID locks. Thus, the state of server_file_journal and the xattr table should be consistent with the GUID table. Since the GUID tables and server_file_journal are located on different machines, content management system 106 can query the guid_path table and ensure that latest paths are consistent with what was in the server_file_journal. If not, then content management system 106 can assume that path had no previous GUID, otherwise that GUID is available for reassignment in commit_batch( ).

The client application can make changes to the local file system by creating a new content item in a temporary content item stored in a cache location or cache directory. Then, when the temporary content item is ready, the client application moves the original content item to the temporary space and then moves the temporary content item to the location of the original. This approach does not preserve inode data on Mac® OS X® or the Object ID on Windows®, which are the native GUID mechanisms on these operating systems. To limit the potential impact the client application can make modify or intercept the appropriate OS-native calls that implement GUID mechanisms to preserve these identifiers. For example, on Mac® OS X®, the client application can modify or intercept the inode-preserving file update system call exchangedata( ). On Windows®, the client application can modify or intercept the system call ReplaceFile( ).

Figure 3:
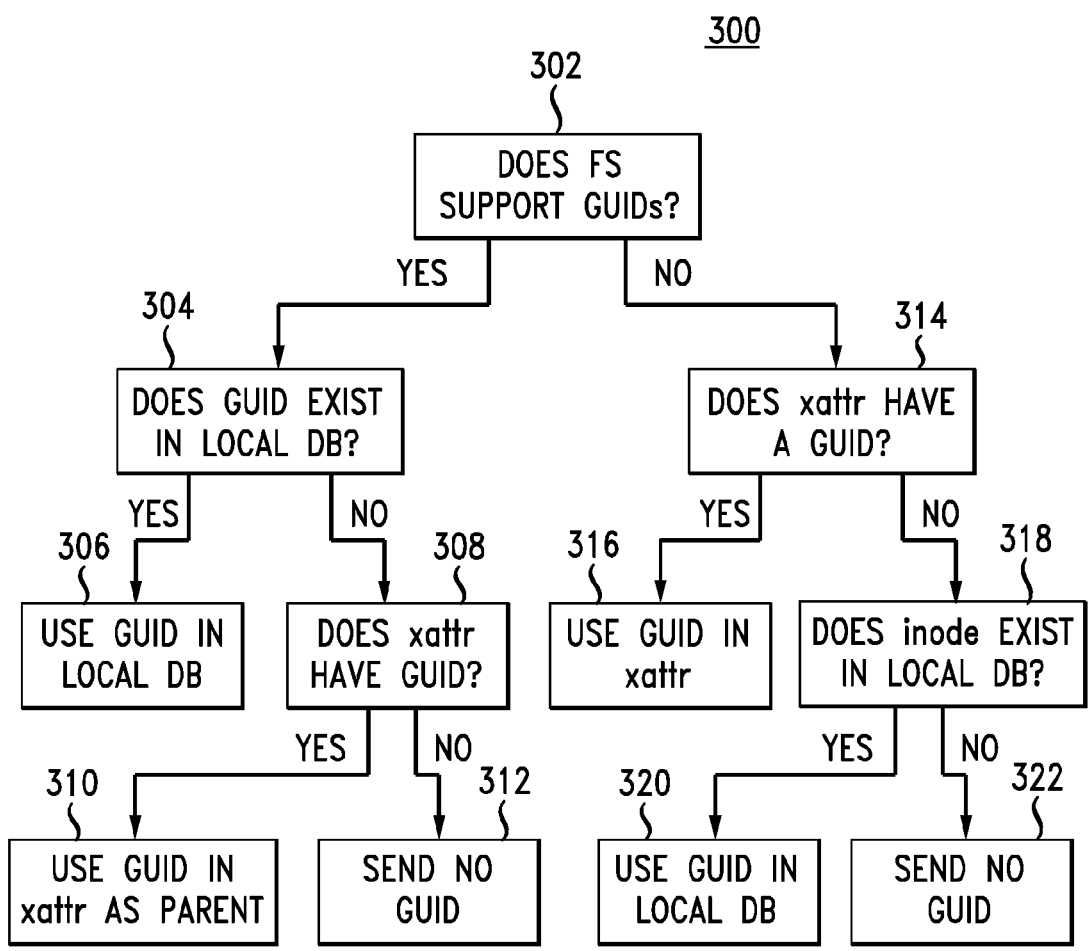
FIG. 3 shows an example flowchart for determining a GUID for a local content item change operation.

FIG. 3 shows an example logical flow 300 for determining a GUID based on a local content item change at a client, as reported by the client application in an asynchronous access model. This logical flow 300 can guide all or part of how the client application modifies or intercepts the system calls referenced above. The client application can first determine if the file system supports GUIDs (302). If yes, then the client application can check if the GUID exists in the local database (304) for a content item in question. If the GUID exists in the local database, then the client application can use the GUID from the local database (306). If the GUID does not exist in the local database, then the client application can check if xattr contains a GUID (308). If xattr contains a GUID, the client application can use the GUID in xattr as the parent GUID (310). If not, then the client application can return no GUID (312). If the client application determines that the file system does not support GUIDs, then the client application can check if xattr has a GUID (314). If so, the client application can use the GUID in xattr (316). If not, the client application can check if an inode exists in the local database (318). If so, the client application can use the GUID in the local database for that inode (320). If not, then the client application can return no GUID (322). Additional modifications can be made to the client's sync database (filecache.dbx) to persist the native GUID and inode associated with each content item's SJID and content management system GUID as content items are synced between the client application and content management system 106 via commit_batch( ). This approach can avoid raciness with the GUID assigning process at content management system 106 if a content item is changing rapidly while the GUID is being assigned at content management system 106 because the client application communicates with content management system 106 to coordinate assignment of GUIDs and to resolve GUID conflicts in advance. Consequently, the client application can perform this or similar logic before committing content items to content management system 106, instead of when content items are being read by the client application.

While GUIDs can provide a convenient way to uniquely reference a specific content item and its revision history, metadata, and other information, regardless of a specific path and content item name, this approach may expose new avenues for exploitation and cracking. For example, an attacker or malicious user may attempt unauthorized access to content item data, GUID spoofing, or ancillary information leakage. An attacker may attempt to use GUIDs to gain access to content item data for which the attacker is not authorized. Indirect leakage of otherwise private information, such as information on whether or not a specific user has had or currently has access to a specific content item object, may also be protected.

With respect to unauthorized access to content item data, the information an attacker can access if they have access to a GUID may include all the revisions across all namespaces that the GUID has traversed, the current content item location of the GUID, and the parent GUID. Content management system 106 can prohibit access to content item data to unauthenticated users unless a user who had access to that data has explicitly made it public, such as via a "Public folder" or other sharing mechanism. For an authenticated user, content management system 106 can grant access to all revisions of all content items in all namespaces to which the authenticated user has access. The namespaces to which a user has access can include the root namespace for that user and all currently subscribed shared folders. To maintain this level of security, content management system 106 may only grant users access to revision data of any GUID for the namespaces that a user currently has access to, as well as anything derivable from that. This is a worst-case security precaution because even if a user has acquired access to every GUID in content management system 106, the user is still only allowed access to content items for which they have already be granted access, and nothing more.

With respect to GUID spoofing, because GUID propagation is influenced in some cases by data that is located in a per-content item local file system specific area (clients which do not have native GUID-like mechanisms already provided by the local file system) and that data is freely available to any application running on that client, an attacker may theoretically artificially attach a GUID to a content item. This is the only vector through which an attacker is able to provoke the system to assign an arbitrary GUID to a content item within their control. To limit the impact of this attack, even if an attacker were to successfully spoof a GUID in this way, the attacker would not actually be able to get access to content item data they would not normally already have access to. Content management system 106 can prevent GUID spoofing by transmitting GUIDs to clients encrypted and signed based on the user ID of the user that they are acting on behalf of, this makes it difficult to spoof an arbitrary GUID retrieved from another source (e.g. a computer running an account linked to a different user, a GUID retrieved via the API, etc.). Content management system 106 can further prevent GUID spoofing by ensuring that that commit_batch( ) will not allow the propagation of a GUID that is not in a namespace the user actually has access to. The only spoofing easily allowed given these two precautions is copying an obfuscated GUID wholesale from one content item to which the user already has access to another content item to which the user has access. This attack does not grant the attacker any more access than they already had and instead just makes the GUID propagation incorrect.

The threat of ancillary information leakage is that an attacker may acquire information about an arbitrary GUID to which they do not already have access. Ancillary information leakage is discussed here in terms of the external interfaces. Users of the API or desktop client will encounter difficulty constructing arbitrary GUIDs that they have not already seen. Instead of querying for metadata based on content item path, the API can allow a user to query for the most recent metadata based on GUID. For a GUID that is not currently at a content item path that is accessible to the user that the API application is acting on behalf of, this call can return error messages that mask whether a particular content item exists, such as returning error 404 (not found) instead of error 403 (forbidden), to prevent accidental leakage about the existence of the GUID in the global system. The other way an attacker may gain information about an arbitrary GUID is via a web interface to content management system 106. To protect against this potential vulnerability, the web interface does not show the user any content item revisions or other data derived from the GUID to which that user does not currently have access.

Having disclosed some system components and GUID concepts, the disclosure now turns to the example method embodiments shown in FIGS. 4-12. For the sake of clarity, each respective example method embodiment is described in terms of an example system 100, as shown in FIG. 1, configured to practice the method. The steps outlined herein are examples and can be implemented in any combination thereof, including combinations that exclude, add, or modify certain steps.

Figure 4:
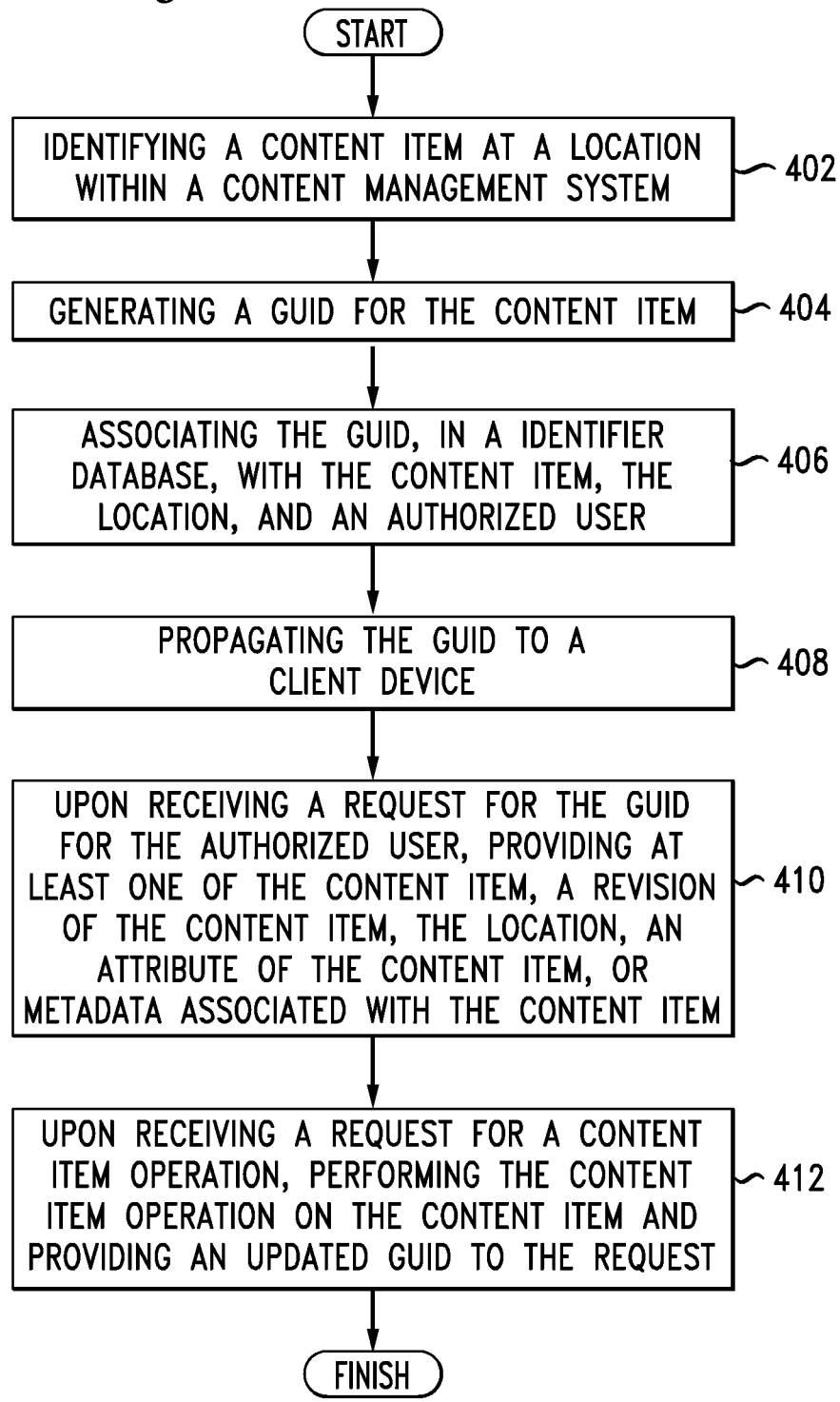
FIG. 4 shows an example method embodiment for implementing GUIDs in a multi-user network-based content management environment.

FIG. 4 shows an example method embodiment for implementing GUIDs in a multi-user network-based content management environment. Content management system 106 can identify a content item at a location within data storage (402), wherein each user of the system can have a respective user account assigned an amount of storage space within content management system 106. Content management system 106 can generate, for the content item, a globally unique identifier (404), wherein the globally unique identifier is unique within content management system 106. Content management system 106 can associate the globally unique identifier, in an identifier database, with the content item, the location, and an authorized user (406), and propagate the globally unique identifier to at least one client device associated with the authorized user (408). Upon receiving a request for the globally unique identifier, content management system 106 can provide to the requesting device at least one of the content item, a revision of the content item, the location, an attribute of the content item, or metadata associated with the content item (410). Then content management system 106 can optionally perform the content item revision on the content item and provide an updated GUID in response to the request (412).

Figure 5:
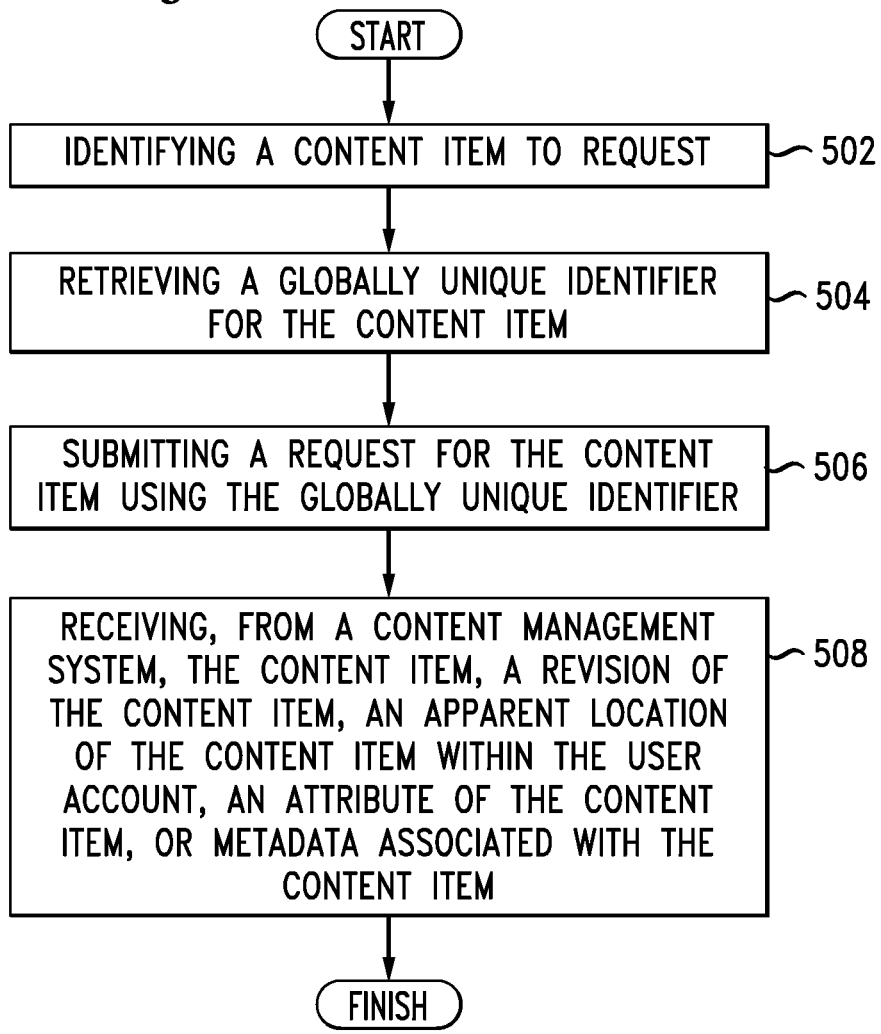
FIG. 5 shows an example method embodiment for a client requesting a content item by GUID.

FIG. 5 shows an example method embodiment for a client requesting a content item by GUID. Client device 102$_i$ can identify a content item to request (502) from a multi-user network-based content management system, such as content management system 106, wherein each user of the content management system is associated with a respective user account having an amount of storage space within the content management system. Then client device 102$_i$ can retrieve a globally unique identifier associated with the content item (504), and submit, to the content management system, a request for the content item (506), wherein the request references the content item by the globally unique identifier, and wherein the request is associated with credentials for a user account associated with the content item at the content management system. Then client device 102$_i$ can receive, from the content management system and in response to the request, at least one of the content item, a revision of the content item, an apparent location of the content item within the user account, an attribute of the content item, or metadata associated with the content item (508). The request can further indicate an action to perform for the content item, such as a content item copy, a content item move, a content item rename, a content item delete, or a content item synchronization operation between a client and the storage environment.

Figure 6:
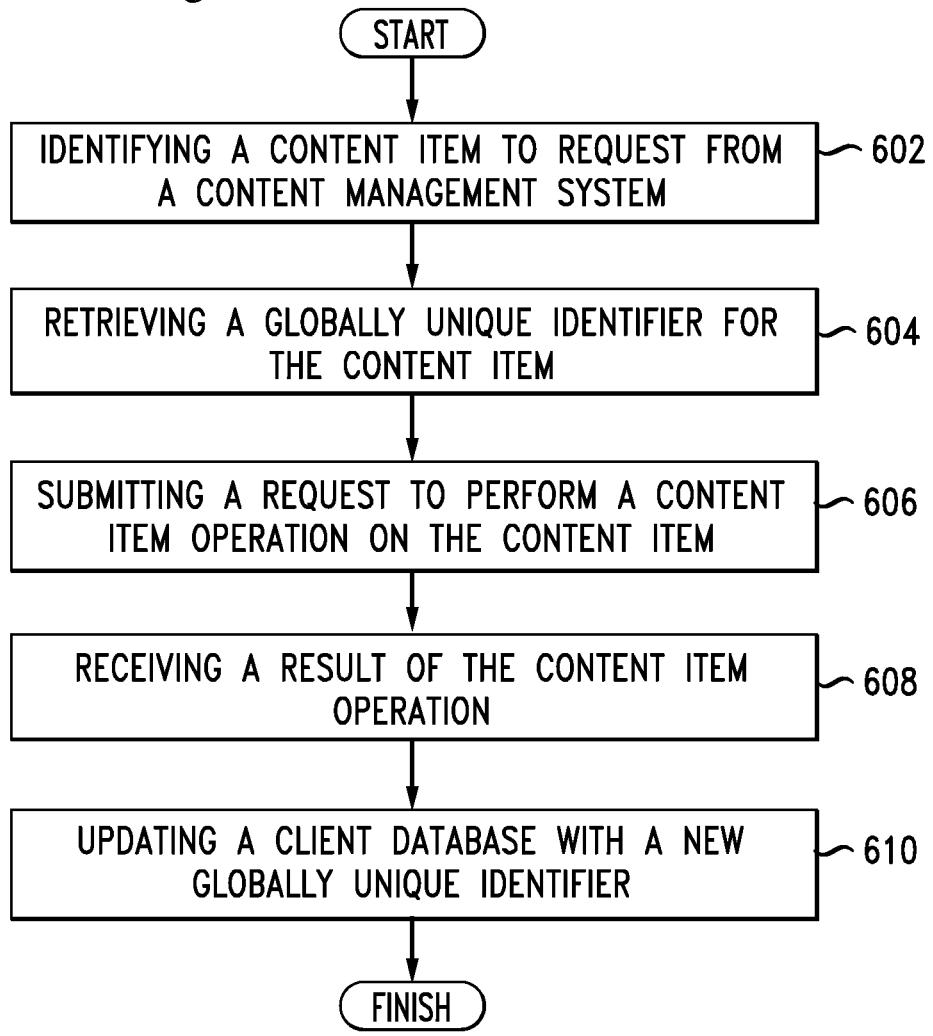
FIG. 6 shows an example method embodiment for handling GUIDs with content item operations.

FIG. 6 shows an example method embodiment for handling GUIDs with content item operations. Client device 102$_i$ can identify a content item to request from content management system 106 (602), wherein each user of the content management system 106 can have a respective user account assigned an amount of storage space. Client device 102$_i$ can retrieve, from a client database, a globally unique identifier associated with the content item (604), and submit, to the content management system 106, a request to perform a content item operation on the content item (606), wherein the request references the content item by the globally unique identifier, and wherein the request is associated with credentials for a user account associated with the content item at the content management system 106. Then client device 102$_i$ can receive, from content management system 106 a result of the content item operation and a new globally unique identifier (608). The client device 102$_i$ can optionally update the client database with the new globally unique identifier (610) and based on the result. In one variation, the client device 102$_i$ can associate the globally unique identifier in the client database with a parent globally unique identifier associated with a parent content item from which the content item was created. This parent-child relationship can indicate a revision history, or a source of a copied content item, for example. Further, the client database can map the globally unique identifier to multiple revisions of the content item, which may span multiple namespaces within the storage environment.

Figure 7:
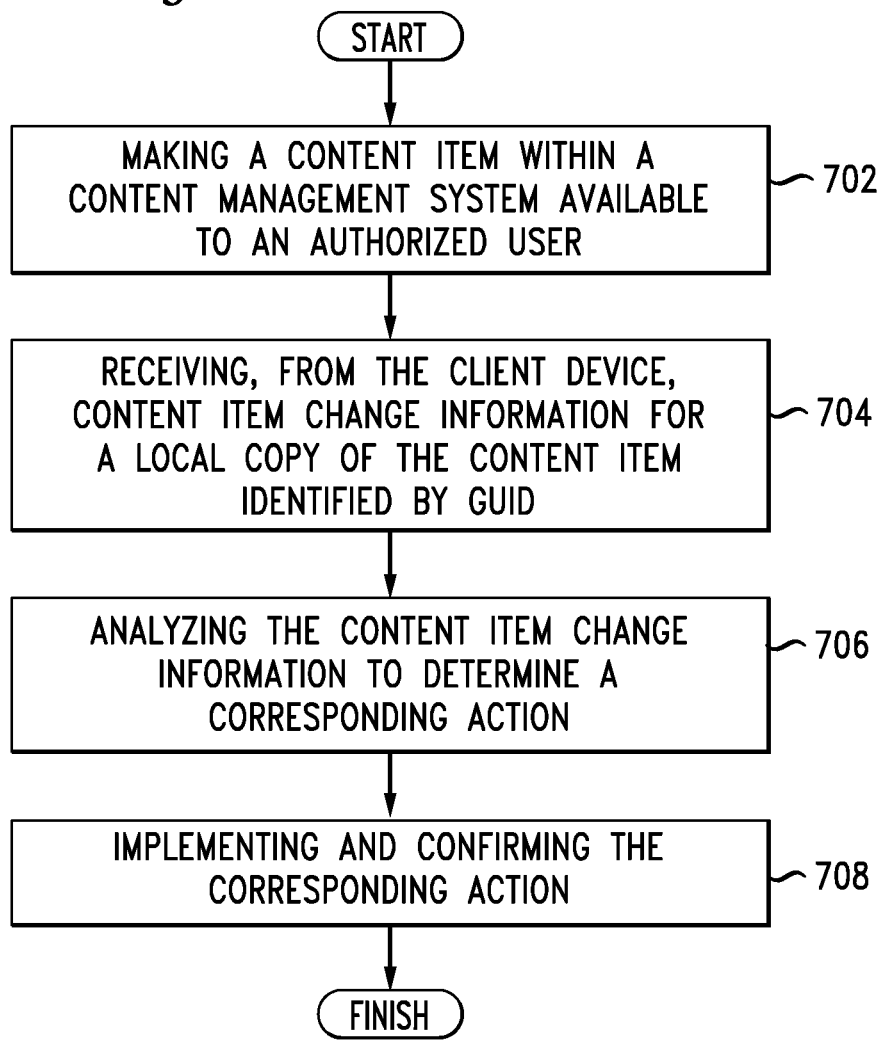
FIG. 7 shows an example method embodiment for maintaining consistent GUIDs for content items that are accessible via a synchronous interface and an asynchronous interface.

FIG. 7 shows an example method embodiment for maintaining consistent GUIDs for content items that are accessible via a synchronous interface and an asynchronous interface. Content management system 106 can make a content item available to an authorized user (702), wherein the content item is addressable via a globally unique identifier, wherein each user of content management system 106 can be associated with a respective user account having an amount of storage space within the content management system 106, and wherein the content management system can sync copies of content items to one or more client devices. Content management system 106 can receive, from a client device, content item change information (704) derived from data generated by an operating system function at the client device, and analyze the content item change information (706) to determine a corresponding action at content management system 106. Content management system 106 can implement the corresponding action in the storage environment and optionally provide a confirmation of the corresponding action to the client device (708).

Figure 8:
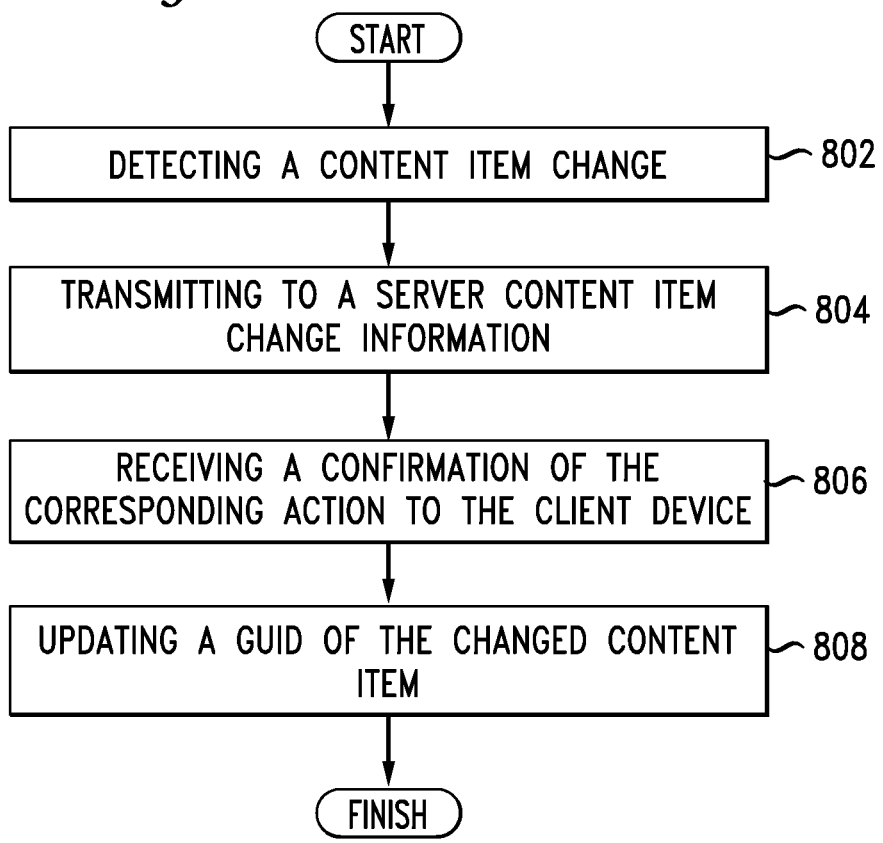
FIG. 8 shows an example method embodiment for inferring move and copy relationships between content items and updating GUIDs accordingly.

FIG. 8 shows an example method embodiment for inferring move and copy relationships between content items and updating GUIDs accordingly. Client device 102$_i$ can detect a content item change (802) at a local file system in a synchronized folder, for example, and transmit, to content management system 106, content item change information (804). Client device 102$_i$ can receive a confirmation of the corresponding action from content management system 106 (806), and update a GUID of the changed content item (808).

Figure 9:
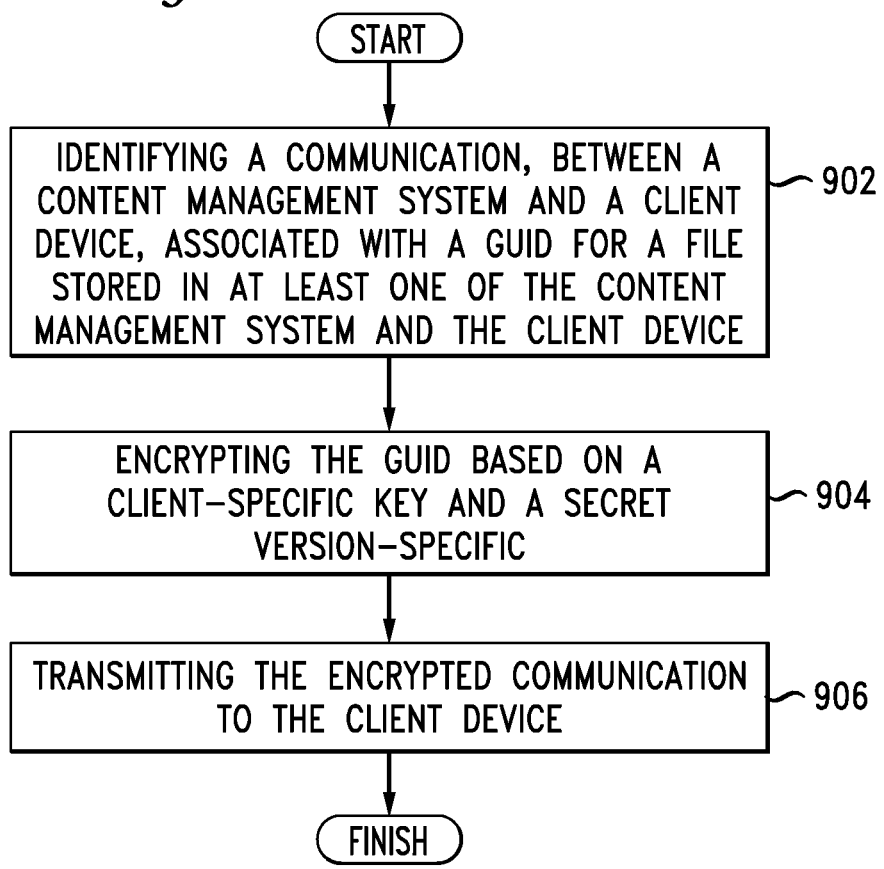
FIG. 9 shows an example method embodiment for encrypting GUIDs at communication boundaries at a server side.

FIG. 9 shows an example method embodiment for encrypting GUIDs at communication boundaries at a server side. The server identifies a communication (902), between a storage environment and a client device, associated with a GUID for a content item stored in at least one of the storage environment or the client device. The server can encrypt the GUID (904) based on a client-specific key and a secret version-specific key. In one embodiment, the server encrypts the entire communication, but may only encrypt the GUID portion or some other portion of the communication. Then the server can transmit the encrypted communication to the client device (906) or authorize transmission by some other entity or otherwise cause the encrypted communication to be sent to the client.

Figure 10:
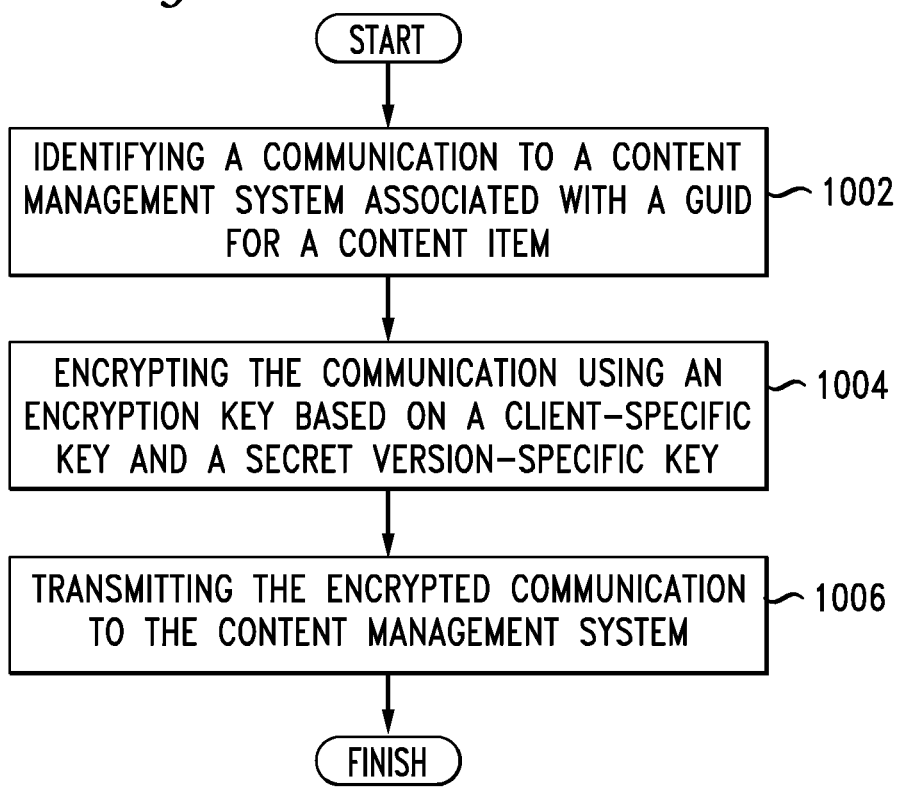
FIG. 10 shows an example method embodiment for encrypting GUIDs at communication boundaries at a client side.

FIG. 10 shows an example method embodiment for encrypting GUIDs at communication boundaries at a client side. Client device $102_i$ can identify a communication to content management system 106 associated with a GUID for a content item (1002). Client device $102_i$ can encrypt the communication using an encryption key based on a client-specific key and a secret version-specific key (1004). Then Client device $102_i$ can transmit the encrypted communication to content management system (1006). Client device $102_i$ can include an internal GUID cryptographic module that can handle encryption and decryption, such as a cryptographic library or cryptographic routines incorporated as part of a client application for communicating with the storage environment.

Figure 11:
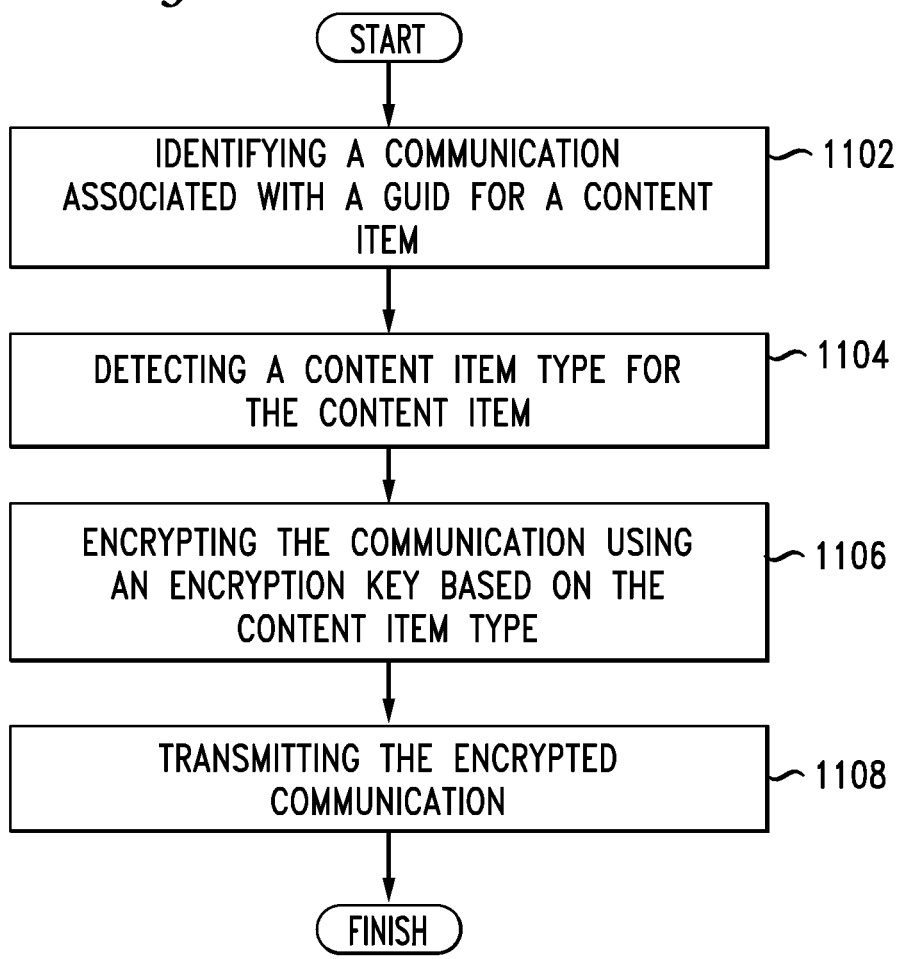
FIG. 11 shows an example method embodiment for encrypting GUIDs based on communication type.

FIG. 11 shows an example method embodiment for encrypting GUIDs based on communication type. The type of communication can be determined based on a source or intended recipient of the communication, a security level for a GUID, a communication protocol for the communication, whether an encryption flag is set, a content item type, and so forth. The example in FIG. 11 is discussed in terms of a content item type, but the initiating system can determine whether to encrypt a communication based on any factor indicating the communication type, as well as determine an encryption strength or an encryption scheme. In one embodiment, the initiator of the communication can indicate whether the communication will be encrypted. The system can identify a communication associated with a GUID for a content item 1102. The system can detect a content item type for the content item 1104. Then the system can encrypt the communication using an encryption key based on the content item type 1106, and transmit the encrypted communication 1108.

Figure 12:
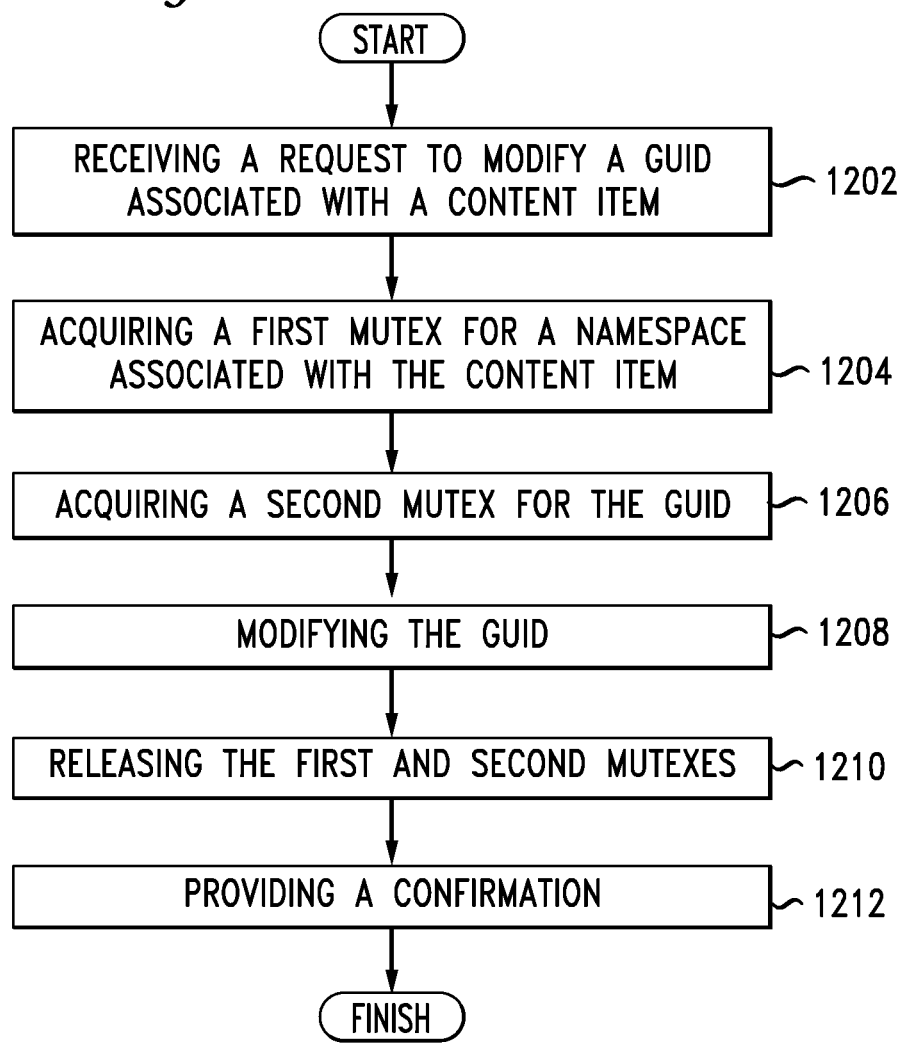
FIG. 12 shows an example method embodiment for maintaining currency and consistency in GUID operations.

FIG. 12 shows an example method embodiment for maintaining concurrency and consistency in GUID operations, such as in an asynchronous environment where both a client device and a content management system can modify GUIDs for the same content items and attempt to later reconcile those modifications. In one example, content management system 106 can maintain a canonical list of GUIDs and revision histories for content items, but accept suggestions from a client device and can incorporate those suggestions that do not conflict with the GUID information already at content management system 106. Content management system 106 can receive a request to modify a GUID associated a content item maintained by content management system 106 (1202), wherein each user of content management system 106 is associated with a respective user account having an amount of storage space within content management system 106, and wherein content management system 106 can sync copies of content items with one or more client devices. Content management system 106 can then acquire a first mutex for a namespace associated with the content item (1204), and a second mutex for the GUID to be modified (1206). Then content management system 106 can modify the GUID (1208) according to the request. After the modification, content management system 106 can release the first mutex and the second mutex (1210), and optionally provide a confirmation in response to the request (1212).

Figure 13A:
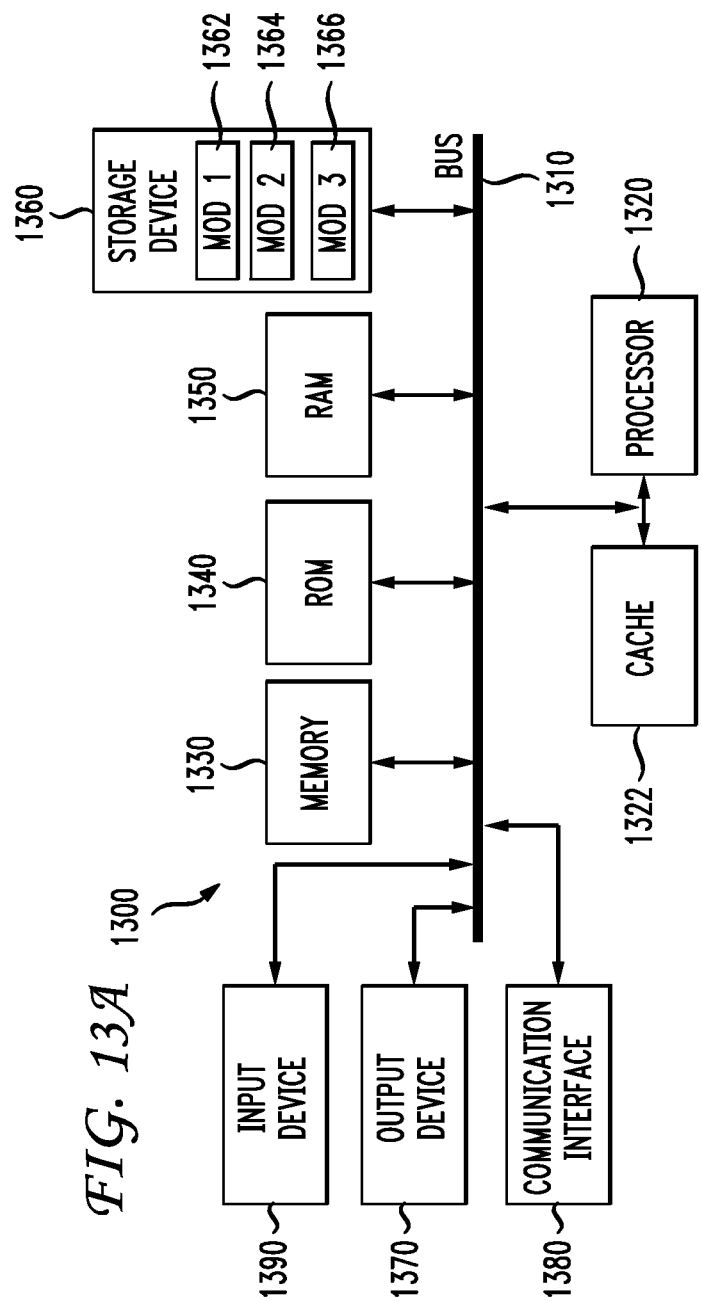
FIG. 13A shows a conventional system bus computing system architecture.
Figure 13B:
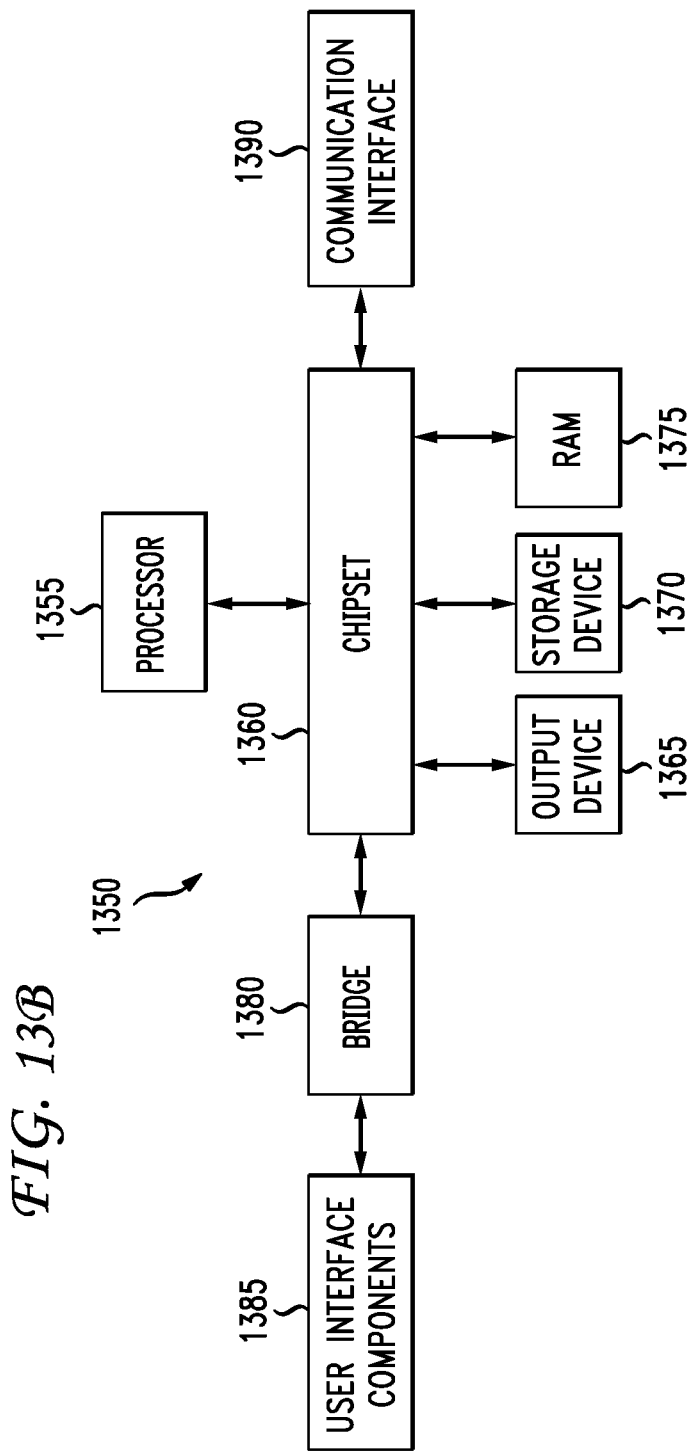
FIG. 13B shows a computer system having a chipset architecture.

FIG. 13A, and FIG. 13B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 13A illustrates a conventional system bus computing system architecture 1300 wherein the components of the system are in electrical communication with each other using a bus 1305. Exemplary system 1300 includes a processing unit (CPU or processor) 1310 and a system bus 1305 that couples various system components including the system memory 1315, such as read only memory (ROM) 1320 and random access memory (RAM) 1325, to the processor 1310. The system 1300 can include a cache of high-speed memory connected directly with, in close proximity to, or integrated as part of the processor 1310. The system 1300 can copy data from the memory 1315 and/or the storage device 1330 to the cache 1312 for quick access by the processor 1310. In this way, the cache can provide a performance boost that avoids processor 1310 delays while waiting for data. These and other modules can control or be configured to control the processor 1310 to perform various actions. Other system memory 1315 may be available for use as well. The memory 1315 can include multiple different types of memory with different performance characteristics. The processor 1310 can include any general purpose processor and a hardware module or software module, such as module 1 1332, module 2 1334, and module 3 1336 stored in storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction with the computing device 1300, an input device 1345 can represent any number of input mechanisms, such as a microphone for speech, a touch-sensitive screen for gesture or graphical input, keyboard, mouse, motion input, speech and so forth. An output device 1335 can also be one or more of a number of output mechanisms known to those of skill in the art. In some instances, multimodal systems can enable a user to provide multiple types of input to communicate with the computing device 1300. The communications interface 1340 can generally govern and manage the user input and system output. There is no restriction on operating on any particular hardware arrangement and therefore the basic features here may easily be substituted for improved hardware or firmware arrangements as they are developed.

Storage device 1330 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1325, read only memory (ROM) 1320, and hybrids thereof.

The storage device 1330 can include software modules 1332, 1334, 1336 for controlling the processor 1310. Other hardware or software modules are contemplated. The storage device 1330 can be connected to the system bus 1305. In one aspect, a hardware module that performs a particular function can include the software component stored in a computer-readable medium in connection with the necessary hardware components, such as the processor 1310, bus 1305, display 1335, and so forth, to carry out the function.

FIG. 13B illustrates a computer system 1350 having a chipset architecture that can be used in executing the described method and generating and displaying a graphical user interface (GUI). Computer system 1350 is an example of computer hardware, software, and firmware that can be used to implement the disclosed technology. System 1350 can include a processor 1355, representative of any number of physically and/or logically distinct resources capable of executing software, firmware, and hardware configured to perform identified computations. Processor 1355 can communicate with a chipset 1360 that can control input to and output from processor 1355. In this example, chipset 1360 outputs information to output 1365, such as a display, and can read and write information to storage device 1370, which can include magnetic media, and solid state media, for example. Chipset 1360 can also read data from and write data to RAM 1375. A bridge 1380 for interfacing with a variety of user interface components 1385 can be provided for interfacing with chipset 1360. Such user interface components 1385 can include a keyboard, a microphone, touch detection and processing circuitry, a pointing device, such as a mouse, and so on. In general, inputs to system 1350 can come from any of a variety of sources, machine generated and/or human generated.

Chipset 1360 can also interface with one or more communication interfaces 1390 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1355 analyzing data stored in storage 1370 or 1375. Further, the machine can receive inputs from a user via user interface components 1385 and execute appropriate functions, such as browsing functions by interpreting these inputs using processor 1355.

It can be appreciated that exemplary systems 1300 and 1350 can have more than one processor 1310 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system comprising:
   a processor; and
   a non-transitory computer-readable storage medium having stored therein processor-executable instructions for causing the processor to:
   receive a request to modify a content item associated with a globally unique identifier where the content item is stored in a multi-user network-based content item management environment and the globally unique identifier is associated with the content item, a storage location and at least one authorized user having access to the content item;
   acquire a first mutex for a namespace associated with the content item;
   acquire a second mutex for the globally unique identifier;
   modify the content item associated with the globally unique identifier according to the request;
   release the first mutex and the second mutex; and
   provide a confirmation in response to the request.

2. The system of claim 1, wherein the globally unique identifier maps to a plurality of revisions of the content item.

3. The system of claim 1, wherein the globally unique identifier maps to a path in the storage environment.

4. The system of claim 1, wherein the globally unique identifier maps to a branch point in a content item storage system of the storage environment.

5. The system of claim 1, wherein mappings associated with the globally unique identifier are stored in tables sharded across multiple computing devices.

6. The system of claim 5, wherein the mappings are sharded using a prefix of the globally unique identifier as a key in to a global table that maps the prefix to a corresponding one of the multiple computing devices storing a respective shard.

7. A computer-implemented method comprising:
receiving a request to modify a globally unique identifier associated with a content item in a multi-user network-based content item management environment storing content items addressable by globally unique identifiers unique within the content item management environment, wherein each globally unique identifier is associated with a respective content item, a respective storage location, and at least one authorized user having access to the respective content item;
acquiring a first mutex for a namespace associated with the content item;
acquiring a second mutex for the globally unique identifier;
modifying, via a processor, the globally unique identifier according to the request;
releasing the first mutex and the second mutex; and
providing a confirmation in response to the request.

8. The method of claim 7, further comprising:
determining that a first database commit succeeds for a server file journal upon modifying the globally unique identifier;
determining that a second database commit fails for a globally unique identifier database upon modifying the globally unique identifier; and
modifying the globally unique identifier a second time.

9. The method of claim 7, wherein the second mutex comprises a row-level lock in a database.

10. The method of claim 9, further comprising, prior to acquiring the second mutex:
confirming that a corresponding row, for the row-level lock, exists in the database.

11. The method of claim 7, wherein the request indicates a plurality of globally unique identifiers, the method further comprising:
identifying that one of the plurality of globally unique identifiers is no longer needed; and
updating a mapping for the one of the plurality of globally unique identifiers to indicated a status of abandoned.

12. The method of claim 7, wherein the first mutex comprises an application-level lock for the namespace.

13. The method of claim 7, wherein the request to modify the globally unique identifier is received from a client device, and wherein the confirmation is provided to the client device.

14. A non-transitory computer-readable storage medium having stored therein instructions which, when executed by a processor, cause the processor to perform a method comprising:
receiving, from a client device, a request to perform a content item operation that affects a globally unique identifier associated with a content item, the content item is stored in a multi-user network-based content item management environment storing content items addressable by globally unique identifiers unique within the content item management environment, wherein each globally unique identifier is associated with a respective content item, a respective storage location, and at least one authorized user having access to the respective content item;
acquiring a first mutex for a namespace associated with the content item operation;
acquiring a second mutex for the globally unique identifier;
performing the content item operation according to the request;
updating the globally unique identifier based on the content item operation;
releasing the first mutex and the second mutex; and
providing a confirmation to the client device in response to the request.

15. The non-transitory computer-readable storage medium of claim 14, wherein the globally unique identifier is at least a 128-bit integer.

16. The non-transitory computer-readable storage medium of claim 14, wherein the second mutex comprises a row-level lock in a database.

17. The non-transitory computer-readable storage medium of claim 14, further comprising, prior to acquiring the second mutex:
confirming that a corresponding row, for the row-level lock, exists in the database.

18. The non-transitory computer-readable storage medium of claim 14, wherein the first mutex comprises an application-level lock for the namespace.

19. The non-transitory computer-readable storage medium of claim 14, wherein the confirmation indicates a deviation from the content item operation requested by the client device.

* * * * *